(12) United States Patent
King

(10) Patent No.: US 9,060,543 B2
(45) Date of Patent: Jun. 23, 2015

(54) COMESTIBLE COATING DELIVERY METHOD AND APPARATUS

(75) Inventor: Peter King, Oxford (GB)

(73) Assignee: SPICE APPLICATION SYSTEMS, LTD., Didcot, Oxfordshire (GB)

( * ) Notice: Subject to any disclaimer, the term of this patent is extended or adjusted under 35 U.S.C. 154(b) by 664 days.

(21) Appl. No.: 13/369,525

(22) Filed: Feb. 9, 2012

(65) Prior Publication Data

US 2012/0207888 A1 Aug. 16, 2012

(51) Int. Cl.
*A23P 1/08* (2006.01)
*A23G 4/02* (2006.01)
*A23L 1/00* (2006.01)
*A21C 3/02* (2006.01)

(52) U.S. Cl.
CPC .............. *A23P 1/082* (2013.01); *A23G 4/025* (2013.01); *A23L 1/0047* (2013.01); *A21C 3/02* (2013.01)

(58) Field of Classification Search
CPC .................................. A23G 3/20; A23P 1/08
USPC ........ 426/87, 235–237, 89, 96, 293; 118/626, 118/629, 636, 300, 308–310, 19, 24; 427/483, 213; 99/494, 352, 451, 536
See application file for complete search history.

(56) References Cited

U.S. PATENT DOCUMENTS

| | | | | |
|---|---|---|---|---|
| 1,424,286 A | * | 8/1922 | Fankhauser | 118/24 |
| 1,759,608 A | * | 5/1930 | Ehrhart | 99/352 |
| 1,958,406 A | * | 5/1934 | Darrah | 361/228 |
| 2,119,910 A | * | 6/1938 | Ferry | 99/352 |
| 2,604,056 A | | 2/1948 | Mahle | |
| 2,595,342 A | * | 5/1952 | Dosmann | 427/482 |
| 2,659,338 A | * | 11/1953 | Harrison | 118/16 |
| 2,773,472 A | * | 12/1956 | Lamm | 118/624 |
| 2,794,751 A | * | 6/1957 | Javinall | 427/482 |
| 2,806,803 A | * | 9/1957 | Thackara et al. | 427/464 |
| 3,045,640 A | * | 7/1962 | Hill et al. | 118/16 |
| 3,114,482 A | * | 12/1963 | Dunaway | 222/328 |
| 3,152,010 A | * | 10/1964 | Case | 118/24 |

(Continued)

FOREIGN PATENT DOCUMENTS

| | | |
|---|---|---|
| GB | 1174485 | 12/1969 |
| GB | 1174486 | 12/1969 |
| JP | 61181367 | 8/1986 |

OTHER PUBLICATIONS

Search Report from related GB patent application GB1102262.1.

*Primary Examiner* — Steven Leff

(74) *Attorney, Agent, or Firm* — Anderson Gorecki & Rouille LLP

(57) ABSTRACT

The present invention relates to an improved apparatus and method for delivering a coating substance and to an improved apparatus for delivering a powder coating to glutinous products such as confectionery/bakery, gum and dough-like products in a manufacturing and/or packaging procedure. Chewing gum is typically produced by combining chewing gum components, extruding and subsequently rolling a gum composition into a uniform flat sheet of a desired thickness and width. During processing, the extruded material must pass through a series of rollers to produce the ultimate product. In a conventional process, a rolling compound or powdered non-stick agent may be applied to the sheet during processing to avoid fouling of the rollers by a tacky material. Present systems for the application of dusting are inefficient and lead to the loss of much powder. The present invention seeks to provide an improved system.

17 Claims, 5 Drawing Sheets

(56) References Cited

U.S. PATENT DOCUMENTS

| | | | | |
|---|---|---|---|---|
| 3,221,938 | A * | 12/1965 | Yonkers et al. | 222/148 |
| 3,253,944 | A * | 5/1966 | Wurster | 427/213 |
| 3,275,239 | A * | 9/1966 | Oesterle | 239/702 |
| 3,413,917 | A * | 12/1968 | Fisher et al. | 101/114 |
| 3,457,080 | A * | 7/1969 | Watkins | 426/239 |
| 3,468,691 | A * | 9/1969 | Watkins | 426/239 |
| 3,964,683 | A * | 6/1976 | Gimple | 239/691 |
| 4,210,074 | A * | 7/1980 | Laughman | 99/494 |
| 4,270,486 | A * | 6/1981 | Leverenz | 118/679 |
| 4,324,198 | A * | 4/1982 | Muz | 118/630 |
| 4,419,953 | A * | 12/1983 | Fowler | 118/16 |
| 4,548,825 | A * | 10/1985 | Voss et al. | 426/383 |
| 4,576,108 | A * | 3/1986 | Socola et al. | 118/19 |
| 4,702,932 | A * | 10/1987 | Cosentino et al. | 427/479 |
| 4,901,719 | A * | 2/1990 | Trenconsky et al. | 606/49 |
| 4,961,940 | A * | 10/1990 | Hansson | 426/89 |
| 5,222,664 | A * | 6/1993 | Noakes et al. | 239/3 |
| 5,287,801 | A * | 2/1994 | Clark | 99/451 |
| 5,584,931 | A * | 12/1996 | Buhlmann | 118/628 |
| 5,846,324 | A * | 12/1998 | Marshall et al. | 118/19 |
| 6,056,822 | A * | 5/2000 | Jefferson et al. | 118/683 |
| 6,485,569 | B1 * | 11/2002 | Sarakas | 118/303 |
| 2005/0103210 | A1 * | 5/2005 | King | 99/451 |
| 2005/0189698 | A1 | 9/2005 | Somemiya | |
| 2006/0001422 | A1 | 1/2006 | Stelter et al. | |
| 2006/0001722 | A1 * | 1/2006 | Stelter et al. | 347/103 |

* cited by examiner

COMESTIBLE COATING DELIVERY METHOD AND APPARATUS

FIELD OF THE INVENTION

The present invention relates to an improved apparatus and method for delivering a comestible coating substance and more particularly, though not necessarily, to an improved apparatus for delivering a powder coating to glutinous products such as confectionary/bakery, gum and dough-like products in a manufacturing and/or packaging procedure. This invention also relates to the economical manufacture of a confectionery material having a tacky surface such as chewing gum and dough products without substantial and/or wasteful use of a rolling compound or powdered non-stick agent.

BACKGROUND

There exists a wide variety of food products that require to be coated with a substance (e.g. powder, liquid, suspension, etc) during their preparation. For example, snack foods such as potato crisps and corn chips are usually coated with a flavouring agent. It is generally desirable to be able to achieve a uniform and controllable coating over the entire surface of a product. Chewing gum is another product that can have powdered non-stick agents and optionally flavouring applied. Equally, bakery products such as pizzas, rolls and buns are dusted with flour to prevent adjacent products sticking to each other or sticking to packaging.

Chewing gum, commercially distributed as pieces such as sticks, which may be coated, is typically produced by combining chewing gum components including a gum base, flavours, sweeteners, fillers, and binders; extruding such combined components into a slab of typically tacky gum composition material; rolling such slab into a uniform flat sheet of a desired thickness and width; scoring the uniform flat sheet into individual pieces; and ultimately packaging the resulting pieces. During processing, the extruded slab of chewing gum material must pass through a series of rollers to produce the ultimate product. In a conventional process, a rolling compound or powdered non-stick agent may be applied to the sheet during processing to avoid sticking or fouling of the rollers by a tacky gum material.

In a bakery factory where pizza bases, buns, rolls and baps etc. are mass produced then individual pieces of rolls, are packaged in a uniform fashion so that packaged buns are of a uniform height—this is especially true of buns for use with burgers. Thus, once the buns have been baked, cooled, compressed by rollers or otherwise and dusted with flour so that they have a significantly reduced tendency to stick to one another and to any packaging. In order to prevent sticking of product with respect to process machinery and or packaging, an excess of a rolling compound or powdered non-stick agent will typically be applied.

Present systems for the application of dusting/coating/flavouring rely upon several methods, two of which shall be discussed briefly. In the case of generally glutinous products such as confectionary and gum, upon extrusion of a cylindrical glutinous product is fed into a powder vat, fed through a roller to increase a width and reduce a thickness of the material, fed into and through further sets of powder vats and rollers. This will commonly be happening at speeds of 1-5 $ms^{-1}$. In the case of a bakery, scarf feeders or dusting curtains will continuously apply flour—possibly flavoured or additionally/alternatively of a sweet powder. With reference to FIG. 1, there is shown—from U.S. Pat. No. 2,604,056—where, in a candy-gum manufacturing process, an open bottom feed chute 17, 18 is arranged in close proximity to a roller surface 14 or conveyor surface 9. It is notable that this system shows a dust receiver tray, indicative that heavy powders are lost—whilst fine powders will inevitably enter the atmosphere to form an aerosol atmosphere.

In each of such systems the issue is that the powder used in a manufacturing processing stage is effectively applied indiscriminately. Powder applied to rollers and conveyor belts will fall off, with only a small proportion ending upon the desired product. The powder application material is dispersed and a significant amount is wasted. In a confectionary factory, the powder will find its way between rollers and conveyors and ingress between seals in machinery. The atmosphere of the factory will be saturated with particles and becomes an aerosol environment; personnel will need to wear masks; air conditioning ducts and filters need to be cleaned frequently; the fine particles of the aerosol will settle and plant and machinery need to be cleaned frequently. Importantly, there is significant waste of powder product. Additionally the service intervals for the plant are reduced in time because of the additional load on the machinery (bearing seal ingress, for example) and the need to clean control machinery, which will typically have cooling air systems, having filters that also need to be cleaned or replaced.

In view of the above, the use of extensive amounts of a rolling compound or powdered non-stick agent typically causes manufacturing difficulties in controlling powdered material in the atmosphere, adds to manufacturing cost, creates difficulties in handling, increases processing time, may increase volatization of flavours and may apply desired product in a porous non-uniform outer surface.

OBJECT TO THE INVENTION

The present invention seeks to overcome or ameliorate at least some of the disadvantages described above: the present invention seeks to provide a system that can enable a rolling compound or powdered non-stick agent and optionally including flavouring to be applied to gelatinous or bakery products in a more uniform fashion that has heretofore been possible. Further, the present invention seeks to provide a system for applying a rolling compound or powdered non-stick agent to snack foods and the like reliably and evenly across the entire rolled surfaces of the snack.

SUMMARY

According to a first aspect of the present invention there is provided an apparatus for delivering a comestible coating substance towards a product to be processed by a first roller which is operable to rotate and is spaced apart from a conveyor support surface whereby to compress product passing therebetween, wherein an electrostatically charged powder is directed to the roller, which has an opposite electrical potential, whereby to uniformly apply the powder substantially only upon the roller, whereby contact of the roller upon product to be processed is lubricated by loss of powder from the roller to the product.

In this way product does not adhere to the roller or any subsequent roller. By reason of the electrostatic application of the powder to an oppositely charged (grounded) roller, aerosol components are attracted to the roller rather than remaining in the atmosphere associated with the processing machine.

The product to be processed can be one of a gum, such as chewing gum and bubble gum, a dough either baked (raised)

or part-baked bread product, such as bread, baps, rolls, pizza bases or other similar products, including tablets. The product class can be one of articles of food for human or animal consumption and pharmaceuticals.

Oppositely directed rollers, through which products pass between, can be employed; alternatively the roller rotates opposite another conveyor surface. The conveyor can comprise a conveyor support surface such as a conveyor belt, wire belt, inclined surface or opposing second roller, where the roller, acting against such conveyor surface can compress product passing therebetween. In the case where there are two rollers, the electrostatic aerosol assembly may be provided with respect to both rollers.

The electrostatic aerosol assembly is conveniently installed upon a frame which is mounted above a conveyor section and supports one or more electrostatic aerosol devices. For piece products such as pizzas, buns, rolls etc., then the products are uniformly aligned in rows and each row passes under a particular electrostatic device with the width of the electrostatic spray coating tailored to match the width of the product. Conveniently, there are a plurality of powder-jet and electrode assemblies, each powder-jet and electrode assembly covering particular width of the roller. For continuous product, such as gum, which, by means of a series of rollers can be rolled into thin sheet from a generally oval extrusion, then the frame can support a sub-frame which, in turn, supports an electrostatic aerosol device capable of reciprocating motion before the roller. The aerosol device will typically move relatively fast with respect to the circumferential speed of the roller, wherein a raster pattern of distribution of powder upon the roller can be provided.

The rate of powder coverage deposited per unit area can be varied with regard to powder feed rate to powder-jet assembly. In the case of a reciprocating aerosol device, the electrostatic spray may be performed for only part of the scan whereby to reduce the width; the duty cycle of the scan may be reduced and/or intermittent application of the spray in only one of the linear reciprocation directions, whereby to reduce the density of coating.

The electrostatic aerosol device can conveniently comprise an aerosol powder-gas nozzle which is arranged to move across the width of the roller as the roller rotates, whereby to direct a fan of aerosol powder in the vicinity of an electrode so as to impart a charge to said gas flow for dispersing and charging the coating substance flowing from said nozzle. The gas nozzle being moved across whereby to coat a roller arranged to be coated. A number of gas nozzles may be employed, whereby to reduce the distance to be travelled by each gas nozzle. Typically, the width of a roller in these manufacturing systems maybe as small as 40 cm but may extend to 2 m or more.

In a preferred embodiment, a steel or preferably a light weight alloy frame supports a track upon which two or more gas nozzles on a sub-frame can be supported for movement thereon. The frame and sub-frame, since they will extend over a conveyor need to be of lightweight construction and conveniently are manufactured from an aluminium alloy. It is to be noted that the structure needs to be of a sufficient strength to resist the considerable sideways forces that are induced as the apparatus reciprocates laterally.

The present invention is applicable in particular to the coating of confectionary products, gum products and bakery products which require an application of non-stick agent optionally to include a flavouring. However, the invention may also be used to coat other comestible products including, but not limited to, articles of food for human or animal consumption and pharmaceuticals. Animal products, include such products as dog biscuits as well as other animal foodstuffs.

BRIEF DESCRIPTION OF THE DRAWINGS

Some preferred embodiments of the invention will now be described, by way of example, with reference to the accompanying drawings, wherein.

DETAILED DESCRIPTION OF THE PREFERRED EMBODIMENTS

There will now be described, by way of example only, the best mode contemplated by the inventor for carrying out the present invention. In the following description, numerous specific details are set out in order to provide a complete understanding to the present invention. It will be apparent to those skilled in the art, that the present invention may be put into practice with variations of the specific.

Figure 1:
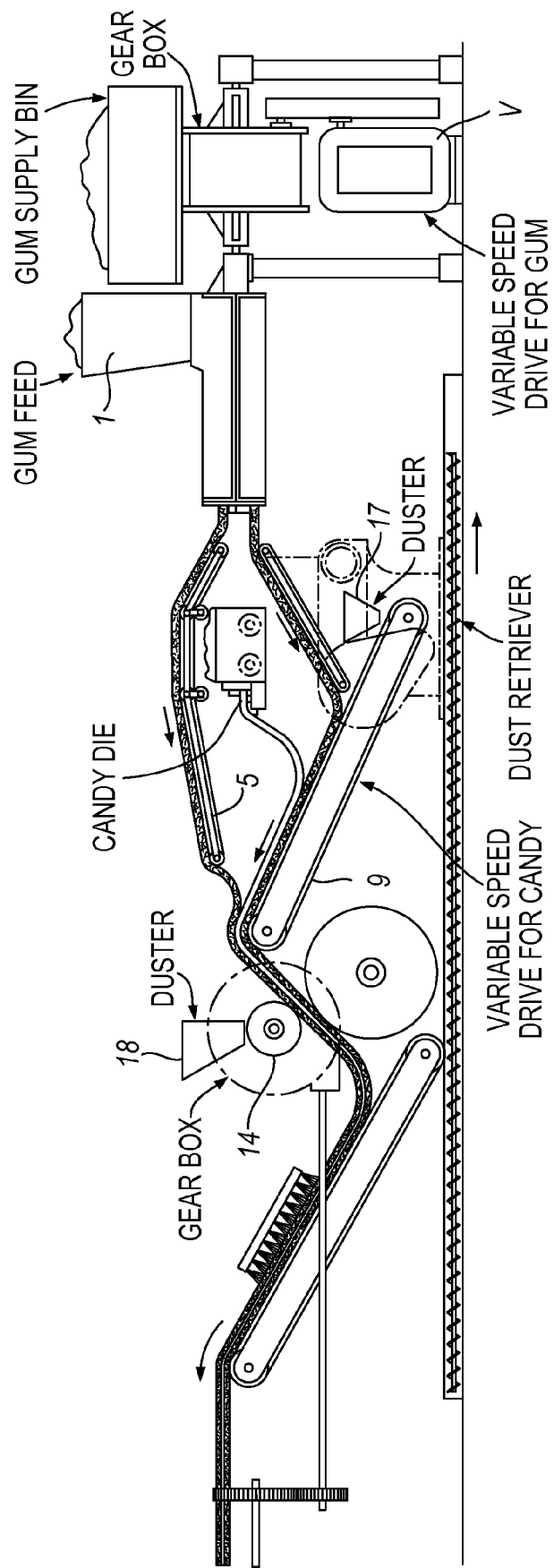
FIG. 1 illustrates a known coating delivery apparatus.
Figure 2:
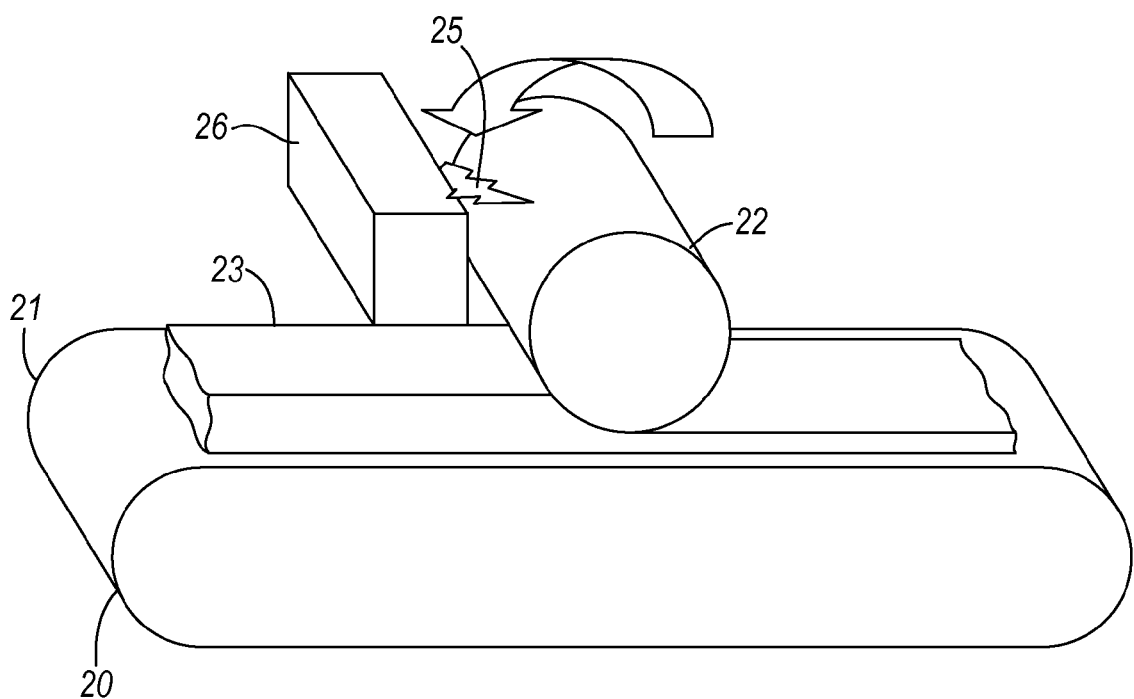
FIG. 2 is a generalised perspective view of roller processing system in accordance with a first aspect of the present invention.
Figure 4:
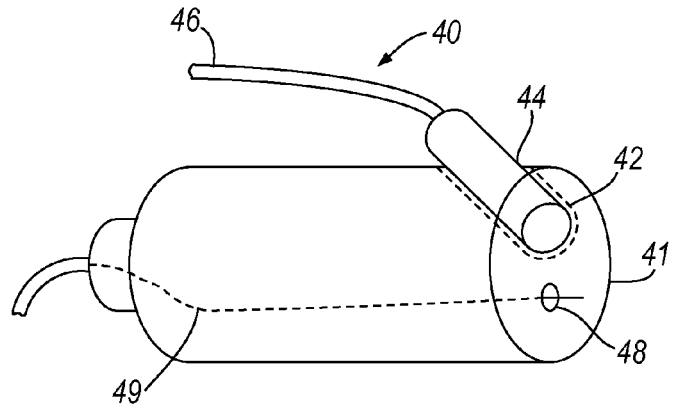
FIG. 4 details a gas delivery nozzle.

Referring now to FIG. 2, there is shown a simplified view of a manufacturing plant where a gum product is reduced in height. Apparatus 20 comprises a conveyor mechanism having a conveyor 21 which transports gum 23 toward a roller 22. After passing under the roller device, the baps are shown as being of a uniform reduced height (note that this is not to scale). Electrostatic spray unit 26 is operable to provide a spray of powder 25 which is directed by gas nozzle (not shown) which gas nozzle also supports an electrode operable to charge the gas and thus the powder. One type of gas nozzle arrangement is illustrated in more detail in FIG. 4. The spray is directed at the roller 22, which is at an opposite potential and, accordingly the charged powder is attracted to the rotating roller in a generally uniform manner, in turn resulting in a generally uniform coating of the roller. As will be appreciated, as the gum 23 passes under the roller 22, (with an axis of rotation shown) the gum gains some powder from having been in contact with the roller. Importantly, any external glutinous substance that faces outwardly will have been treated by the dusting powder. Since the roller is directly coated by the spray, there is effectively little powder which remains in the atmosphere; any aerosol formed is associated with the spray, is charged and is attracted to the roller.

Figure 2A:
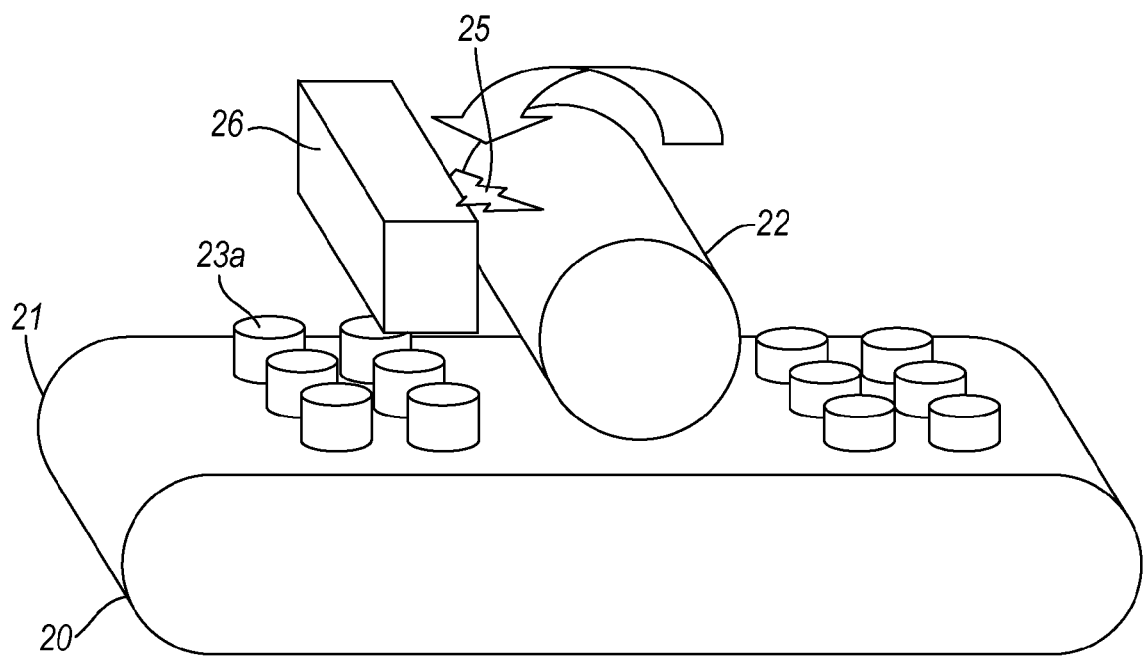
Figure 3:
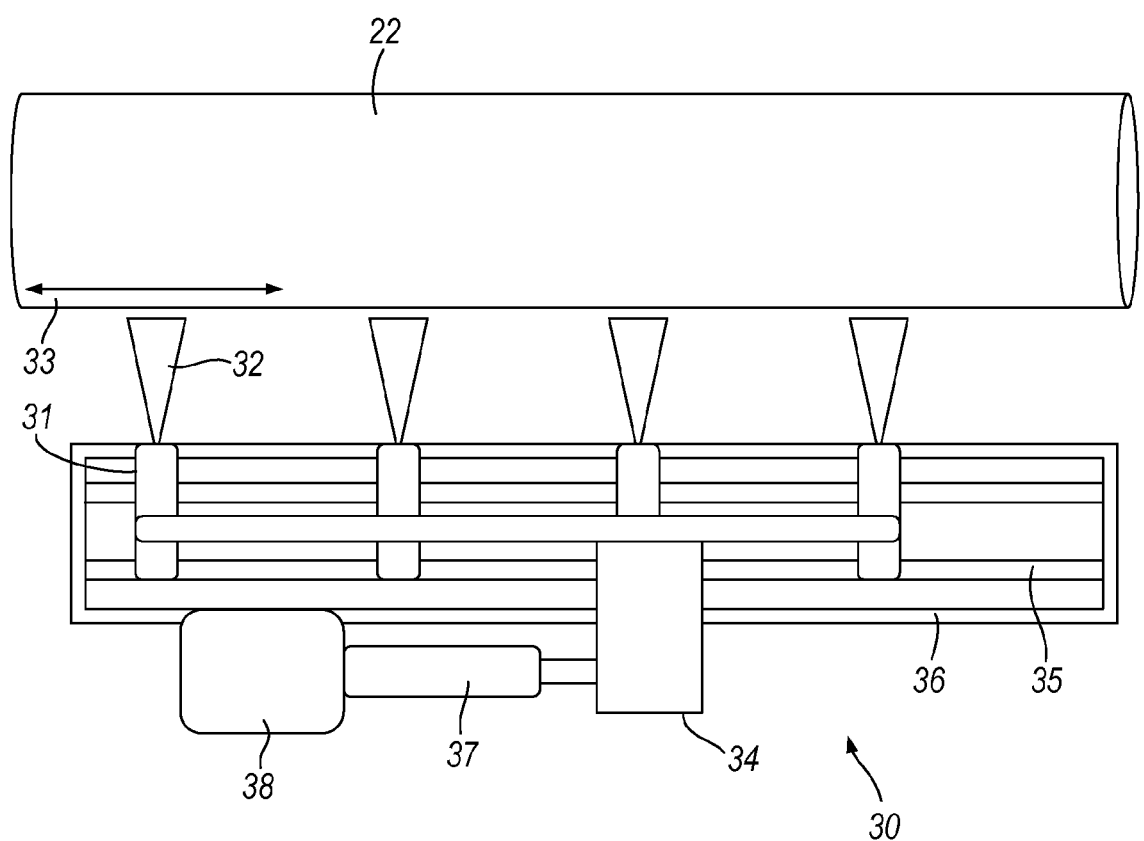
FIG. 3 is a view from above of a first embodiment of the roller coater of FIG. 2.
Figure 3A:
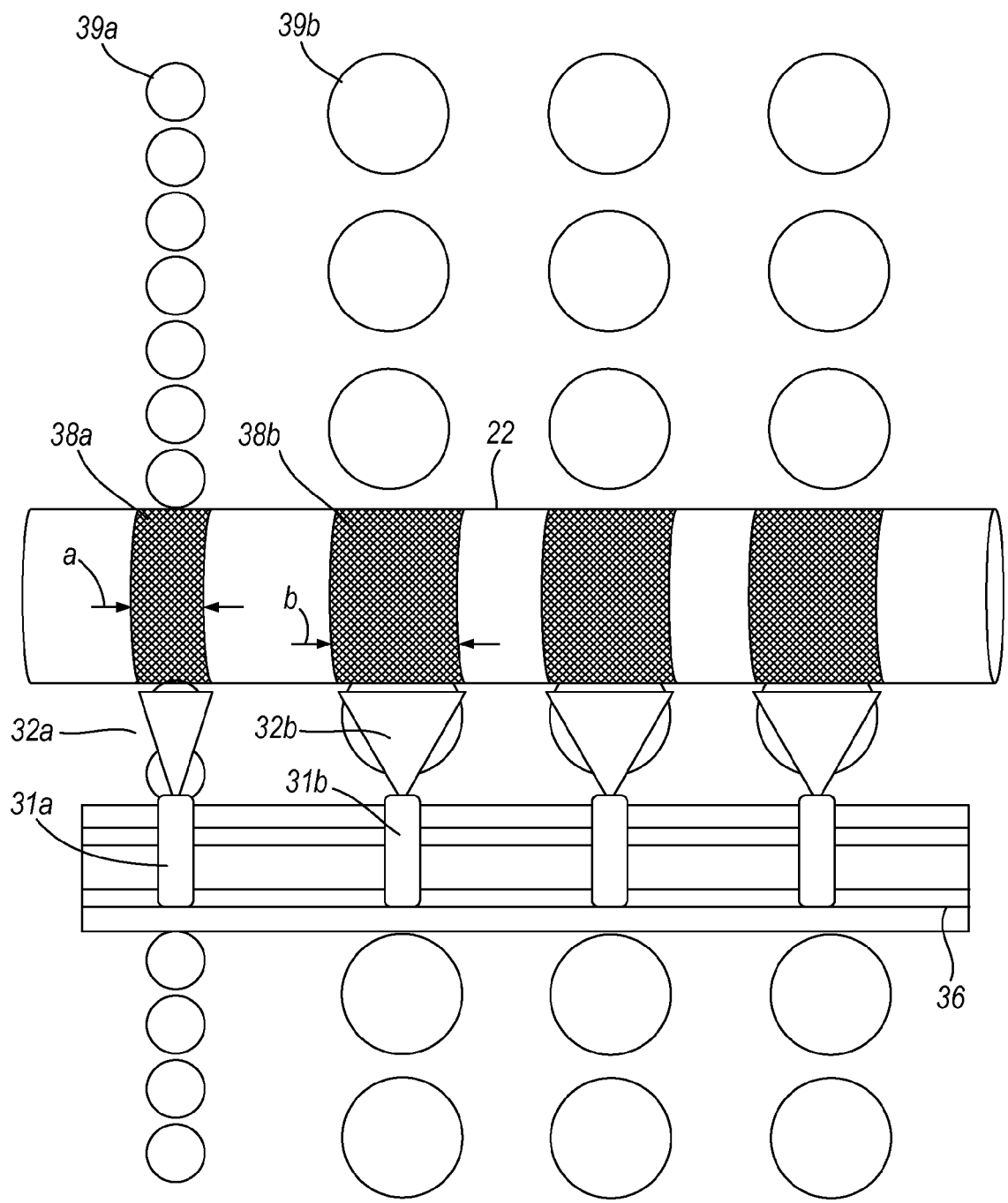
FIG. 3a is a view from above of a second embodiment of the roller coater assembly.

Referring now to FIG. 2a, there is shown a corresponding simplified view of a bread roll manufacturing plant where bread rolls 23a are produced. In this case, conveyor mechanism having a conveyor 21 transports baps 23a toward a roller 22. After passing under the roller device, the baps are shown as being of a uniform reduced height (note that this is not to scale). Powder spray unit 26 is operable to provide a spray of powder 25 which is directed by gas nozzle as in FIG. 2 and electrostatically charged. As will be appreciated, as the baps 23 pass under the roller 22, (with an axis of rotation shown) the baps gain some powder from having been in contact with the roller. Importantly, any glutinous residue that may have been present upon the bun will have been treated by the dusting powder. Since the roller is directly coated by the spray, there is effectively little powder which remains in the atmosphere; any aerosol formed is associated with the spray, is charged and is attracted to the roller.

It is to be realised that the term "roller" also includes systems comprising two rollers, a roller and a conveyor, a roller and a glide plate, and other systems which affect the processing of dough, dough-like products, breads and gums surface through scoring, cutting, surface thickness or imparting heat transfer using at least one rotating cylinder. Rollers may have a non-stick surface coating such as polytetrafluoroethylene (such as sold under the Teflon® brand) or stainless steel. Other types of material for use as a roller are known. In use, the roller is grounded with respect to the charged powder, whereby the charged powder is attracted to the roller.

Typically, the conveyor is an open web or mesh such that contact between a heated slab and the typically metallic (such as stainless steel) conveyor is minimized and the ability for air flow on both surfaces of the slab is maximized. A typical conveyor is a continuous roll of an open mesh which moves over transport rollers. The length of the conveyor will vary from application to application.

A glutinous product such as dough or gum may have particular properties: the term "rheology properties" includes deformation, flow, and elastic properties. Rheological properties of dough or gum are influenced by temperature, crystallization of sugar or polyols, formulation of dough and gum, and other factors. In a particular application, the conveyor 21 may be exposed to ambient air. Alternatively, the conveyor 21 may be exposed to conditioned air and may have a specific relative humidity.

With reference to FIG. 3, there is shown a one electrostatic powder delivery arrangement 30 with an enclosure or cover removed. There are four powder spray units 31 which each emit a conical spray of powder 32 which is charged by electrodes (not shown) and the charged powder is attracted to a grounded roller 22. Each cone of spray 32 describes a raster path 33 on the roller, as the roller rotates, whereby the roller can be uniformly coated. The spray units are mounted upon a sub-frame 34 which travels along a track 35 mounted on frame 36. Sub-frame 34 is moved in a reciprocating fashion by means of pneumatic actuator 37 under the control of control system 38. Parker Origa produce a range of suitable electronic pneumatic cylinders which can operate at pressures of up to 7 Bar and can be supplied in 20, 30, 40 & 50 cm max stroke single and double acting. Other types of actuating systems are possible, using motorised linear tracks, for example, although many other types are known. As can be seen a roller can be dusted by a number of powder spray units 31 such that only a 45 cm movement of reciprocation is required whereby four sprayers can provide a uniform coating as provided by four raster scans. The cones of the spray subtend an are of about 40° so that the spray coverage is in fact about 15 cm in diameter.

FIG. 3*a* shows an alternative system wherein stationary powder guns apply powder to bread products. The example shows two types of bread product 39*a* and 39*b* which are uniformly arranged in rows upon the conveyor (not shown). Whilst it is not expected that differing products of differing size in plan will be patted by roller to conform to a particular height prior to packaging, it is a possibility. Powder guns 31*a* emit a spray of powder 32*a* which is charged by an electrode (not shown) placed between an outlet of the nozzle and the roller. The powder becomes charged either as a result of direct exposure to the electric field created by the charged electrode or by a charge transfer mechanism from the pressurised gas and the electrostatically charged powder is attracted to roller 22 to define a band of width "a" in correspondence with band 38*a* of the roller, whereby powder is applied only to the widths of roller that will be in contact with product 39*a*. Similarly, powder guns 31*b* emit a spray 32*b* which is similarly charged and is attracted to roller 22 to define a band of width "b" in correspondence with band 38*b* of the roller, whereby powder is applied only to the areas of roller that will be in contact with product 39*b*. The powder guns can be adjusted so that they provide bands of powder to the roller in dependence of the shape of the outlet, the type of powder and the gas pressure, the angle of the device to the roller and the distance therefrom. Conveniently the position of the frame 36 can be adjusted so that the width of the spray is adjustable by virtue of proximity to the device to the roller. Additionally, the rate of powder coverage deposited per unit area can be varied with regard to powder feed rate to powder-jet assembly. In the case of a reciprocating aerosol device, the spray device may be operated for only part of the scan whereby to reduce the width; the duty cycle of the scan may be reduced and/or intermittent application of the spray in only one of the linear reciprocation directions, whereby to reduce the density of coating.

The rollers are typically of 100-500 mm in diameter and operate at speeds of between 1 and 10 meters per minute. The guns will be reciprocating at linear speeds in the range of 1-20 meters per minute, so to provide an even coat. It is understood that precise coverage levels of powder will be determined upon application, but a coating density of 10 g per square meter would be typical of a flour dusting operation. The powder emanates from a gas nozzle 31, an electrode (not shown) electrostatically charges the gas and the charged gas imparts a charge to the powder (although the electric field may impart some charge directly to the powder), which electrostatically charged powder is then attracted to an oppositely charged roller, rather than falling downwardly. Where a roller is relatively wide with respect to the spread 38 of powder from the chute, then two or more powder delivery chutes 30 may be fitted, whereby to evenly coat the roller across its width.

Referring now to FIG. 4 a gas nozzle as could be used in the device of FIGS. 2 & 3 shall now be described. Gas nozzle 40 comprises a mounting 41 formed of a piece of plastics material, having a generally cylindrical passage 42 passing therethrough, close to one end of the mounting 41. The passage is designed to receive a complimentary shaped and sized nozzle 44 which, once inserted into the passage 42, can be secured therein with a screw, clip, or similar fastening. Fixed into the mounting 41 is a short needle electrode 48, located in the passage just beneath the mouth of the nozzle. The electrode 48 is coupled via a conductor 49 to a high voltage charging circuit (for example a cascade arrangement) and extends into the volume of gas from nozzle 44 whereby to charge the gas. In use, the electrode is charged up to a voltage of around 85 KV. This voltage generates a substantial electric field about the exit nozzle. At the other end of the nozzle 44, the inlet end, a hose 46 is connected, said hose being coupled to a source of pressurised air (not shown in the figures). The nozzle mounting and the various components attached thereto are designed to withstand the high ambient levels of heat and moisture, and to be suitable for use on a food production line. A suitable control unit is used to control the pressure of air supplied to the nozzle and the voltage applied to the electrode.

It will be appreciated, that the above electrode arrangement is but one of many types of electrode that can be employed. The gas supply and powder feed may be separate from a needle electrode assembly. The electrode could be placed within a gas-powder supply, although such a system could well be subject to maintenance problems. Functions of the powder spray gun are to shape and direct the flow of powder; to control the pattern size, shape and density of powder spray. Accordingly the speed of gas flow, nozzle shape and size will affect distribution pattern or fan shape of product.

Figure 5:
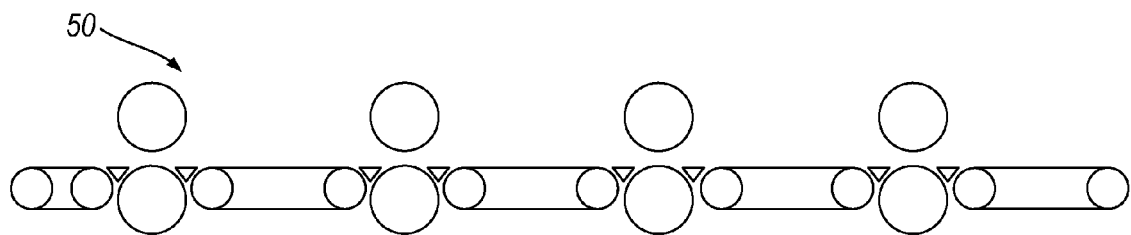
FIG. 5 is a simplified side view of a multiple roller system.
Figure 6:
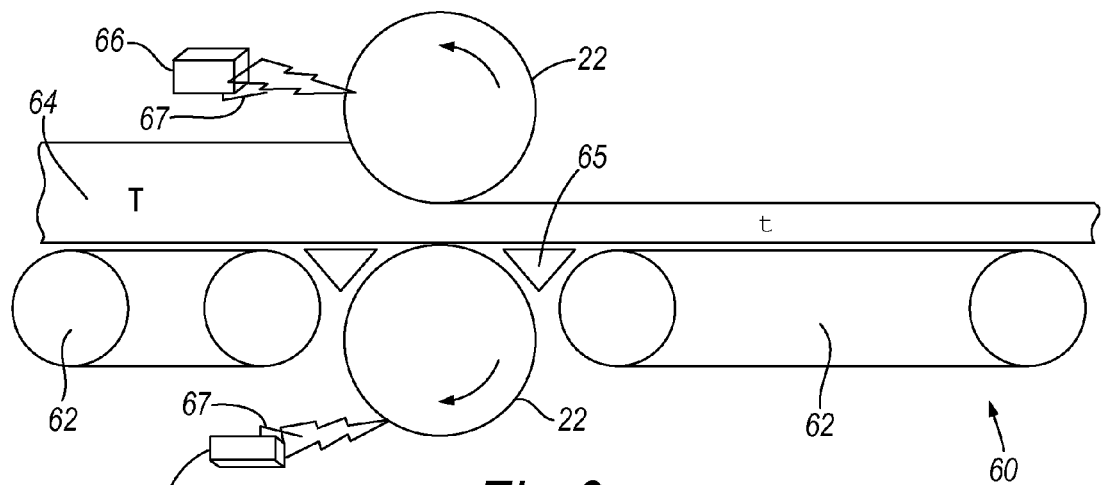
FIG. 6 shows in detail a roller unit of a system shown in FIG. 5.

FIG. 5 shows a roller apparatus 50 with a successive arrangement of rollers as shall be described in relation to FIG. 6. In a typical arrangement an extruded gum is reduced from a thickness of 40 cm to a thickness of about 2 mm or so. It should be taken into account that as the gum is flattened, it may be necessary to operate successive rollers at higher speeds of rotation, with the conveyors being timed to co-operate to avoid bunching of product.

FIG. 6 shows a simplified gum rolling procedure where apparatus 60 comprising conveyor mean 62, 65 is operable to support extruded gum 64. In operation the gum of thickness "T" is brought by the conveyors towards a pair of opposing rollers 22, which have been treated with a powder applied by electrostatic coating device 66, with separate electrode 67—in accordance with the invention—which enable a charged spray of powder to be attracted to rollers 22. The rollers are grounded so that, in operation, charged powders are attracted to the roller. The rollers are conveniently grounded by means of a rolling ground contact, which are used for conveyor products and as such are readily available items as mechanical parts; as will be appreciated plant, covers etc are always grounded in manufacturing systems.

By virtue of the presence of such rollers a minimal amount of powder is employed, whereby the rollers do not pick up glutinous debris from the extruded gum which is reduced in thickness to thickness "t". A typical conveyor is a continuous roll of an open mesh which moves over transport rollers. The length of the conveyor will vary from application to application.

In the case of a gum process, the mixing of a gum with flavourings may be performed at an elevated temperature and the conveyors may be set up to allow cooling of the gum. Typically, the surfaces are cooled by contact with impingement air directed from air jets positioned above and below the conveyor. Although the preferable system is for the conveyor to be constructed as a mesh or open web in order to facilitate impingement of air directed at both surfaces, other systems are possible such as using a cooled conveyor belt or other systems which permit initial surface cooling of the chewing gum slab. As will be appreciated, by having no powder in the atmosphere of the factory, expensive specific air conditioning units with filters will not be necessary.

A significant advantage to the present invention is the lack of waste product in unison with a substantially uniformity of coverage upon a roller so that products such as baps and buns can be urged to adopt a uniform shape by compression with a roller but not stick to or leave residue therewith by virtue of the use of a minimum amount of powder electrostatically attracted to the surface of the roller. Equally the same roller system may be employed with gum, where successive use of powder coated rollers are utilised to reduce an extruded or otherwise formed thick length of glutinous gum into a thin sheet.

By the use of a minimum amount of powder, which in use is electrostatically attracted to a roller, wastage is minimal; aerosol powders will not readily enter the atmosphere surrounding the equipment, thereby considerably improving the working environment for personnel. By having reduced wastage, then equipment will be easier to maintain, again reducing downtime.

The confectionery material may be any hard candy, soft candy, chewing gum, or other confectionery substance, or compound that has a fluid phase or may take a flowable form. In other words, the confectionery material may be any material that may be heated, melted, to form a syrup or be dissolved in a liquid to become flowable as is commonly known in the art. Non-limiting examples of suitable confectionery materials that are flowable or may be placed into a flowable state include syrups, liquids or solids for making hard candies, soft candies, lollipops, fondants, toffees, jellies, chewing gums, chocolates, gelatins and nougats. The confectionery material may include sugar or may be sugar-free. Colouring may be added to the confectionery substrate as desired. The confectionery material may also include a pharmaceutical product or a medicament. This is of considerable advantage in the field of logistics and distribution. Equally this is of advantage in retail where or sweets, candies and the like are identical and where any flavours are applied by dusting, such favouring is dispersed uniformly across the product.

The bakery products may be any bread, pizza base, hamburger roll, bun bap or similar and may comprise un-risen or part-risen dough being processed for pre- and part-baked products. By the use of rollers in a processing stage, products can be shaped in a uniform fashion prior to packaging. This is of considerable advantage in the field of logistics and distribution. Equally this is of advantage in retail where, for example a hamburger bap in a fast-food outlet can manage uniform products which are packaged in a uniform fashion and provide a desired uniform result.

The electrostatic powder feeder apparatus in accordance with the present invention can be retrospectively fitted to known systems, whereby to improve the uniformity of coating of product. The known gas feed electrode device may be replaced by discharge variants: a vibratory chute with an air knife and electrode as known from GB 2,385,810 could be adapted if the chute was sufficiently long and could be moved in an arc over a sufficient width of roller.

The invention claimed is:

1. An apparatus for delivering a comestible coating substance towards a product to be processed by a first roller which is operable to rotate and is spaced apart from a conveyor support surface whereby to compress product passing therebetween, wherein an electrostatically charged powder is directed to the roller, which has an opposite electrical potential, whereby to uniformly apply the powder substantially only upon the roller, whereby contact of the roller upon product to be processed is lubricated by loss of powder from the roller to the product.

2. An apparatus according to claim 1, wherein the product to be processed is one of a gum, a dough, a raised or baked or part-baked bread product, or a pharmaceutical.

3. An apparatus according to claim 1, wherein the conveyor comprises an opposed second roller.

4. An apparatus according to claim 1, wherein the conveyor comprises one or more of a conveyor belt, wire belt or inclined vibratory surface.

5. A system comprising a succession of apparatus in accordance with claim 1.

6. An apparatus according to claim 1, wherein an electrostatic aerosol device has an outlet mounted for reciprocating motion before the roller, wherein a raster pattern of distribution of powder upon the roller can be provided.

7. An apparatus according to claim 1, wherein an electrostatic aerosol device has an outlet mounted for reciprocating motion before the roller, wherein a raster pattern of distribution of powder upon the roller can be provided and wherein the electrostatic aerosol device comprises a powder-jet and electrode assembly, which is mounted upon a sub-frame for movement.

8. An apparatus according to claim 1, wherein an electrostatic aerosol device has an outlet mounted for reciprocating motion before the roller, wherein a raster pattern of distribution of powder upon the roller can be provided and wherein there are a plurality of powder-jet and electrode assemblies, each powder-jet and electrode assembly covering particular portion of a width of the roller.

9. An apparatus according to claim 1, wherein an electrostatic aerosol device has an outlet fixedly mounted for application of a band of powder upon the roller, the band of powder corresponding to a contact width of product passing under the roller.

10. An apparatus according to claim 1, wherein an electrostatic aerosol device has an outlet fixedly mounted for application of a band of powder upon the roller, the band of powder corresponding to a contact width of product passing under the roller, wherein the electrostatic aerosol device comprises a powder-jet and electrode assembly.

11. An apparatus according to claim 1, wherein an electrostatic aerosol device has an outlet fixedly mounted for application of a band of powder upon the roller, the band of powder corresponding to a contact width of product passing under the roller, wherein there are a plurality of powder-jet and electrode assemblies, each powder-jet and electrode assembly covering a particular portion of a width of the roller.

12. An apparatus according to claim 1, wherein an electrostatic aerosol device has an outlet mounted for reciprocating motion before the roller, wherein a raster pattern of distribution of powder upon the roller can be provided and wherein the electrostatic aerosol device comprises a powder-jet and electrode assembly, which is mounted upon a sub-frame for movement, wherein the rate of powder coverage deposited per unit area can be varied with regard to powder feed rate to powder-jet assembly and/or intermittent application of powder-jet and electrode assembly and/or application of powder-jet and electrode assembly in only one of the linear reciprocation directions.

13. An apparatus according to claim 1, wherein an electrostatic aerosol device has an outlet mounted for reciprocating motion before the roller, wherein a raster pattern of distribution of powder upon the roller can be provided and wherein there are a plurality of powder-jet and electrode assemblies, each powder-jet and electrode assembly covering a particular portion of a width of the roller, wherein the rate of powder coverage deposited per unit area can be varied with regard to powder feed rate to powder-jet assembly and/or intermittent application of powder-jet and electrode assembly and/or application of powder-jet and electrode assembly in only one of the linear reciprocation directions.

14. An apparatus according to claim 1, wherein an electrostatic aerosol device has an outlet fixedly mounted for application of a band of powder upon the roller, the band of powder corresponding to a contact width of product passing under the roller, wherein the electrostatic aerosol device comprises a powder-jet and electrode assembly, wherein the rate of powder coverage deposited per unit area can be varied with regard to powder feed rate to powder-jet assembly.

15. An apparatus according to claim 1, wherein the electrostatic aerosol device has an outlet fixedly mounted for application of a band of powder upon the roller, the band of powder corresponding to a contact width of product passing under the roller, wherein the rate of powder coverage deposited per unit area can be varied with regard to powder feed rate to powder-jet assembly.

16. An apparatus according to claim 1, wherein an electrostatic aerosol device has an outlet mounted for reciprocating motion before the roller, wherein a raster pattern of distribution of powder upon the roller can be provided and wherein the electrostatic aerosol device comprises a powder-jet and electrode assembly, which is mounted upon a sub-frame for movement, wherein the frames are adjustably moveable with respect to the roller whereby to control a width of spray from the powder-jet and electrode assemblies.

17. A method of operating a coating apparatus for delivering a comestible coating substance towards a product to be processed by a first roller which is operable to rotate and is spaced apart from a conveyor support surface whereby to compress product passing therebetween, wherein an electrostatically charged powder is directed to the roller, which has an opposite electrical potential, whereby to uniformly apply the powder substantially only upon the roller, whereby contact of the roller upon product to be processed is lubricated by loss of powder from the roller to the product;

The method of coating comprising the following steps:

Directing electrostatically charged coating substance at the first roller; and

Rotating the roller and causing the conveyer to operate such that product introduced is compressed as it passes between the roller and the conveyer, wherein contact of the roller upon product to be processed is lubricated by loss of powder from the roller to the product.

* * * * *